May 9, 1967 W. A. PALMER 3,318,548
FILM MAGAZINE
Filed Oct. 30, 1964 2 Sheets-Sheet 1
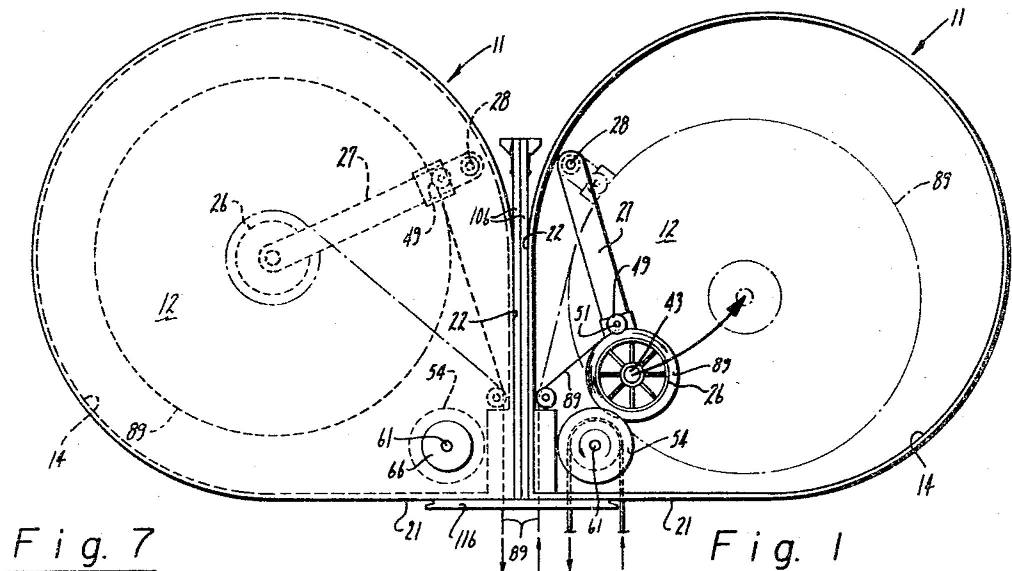
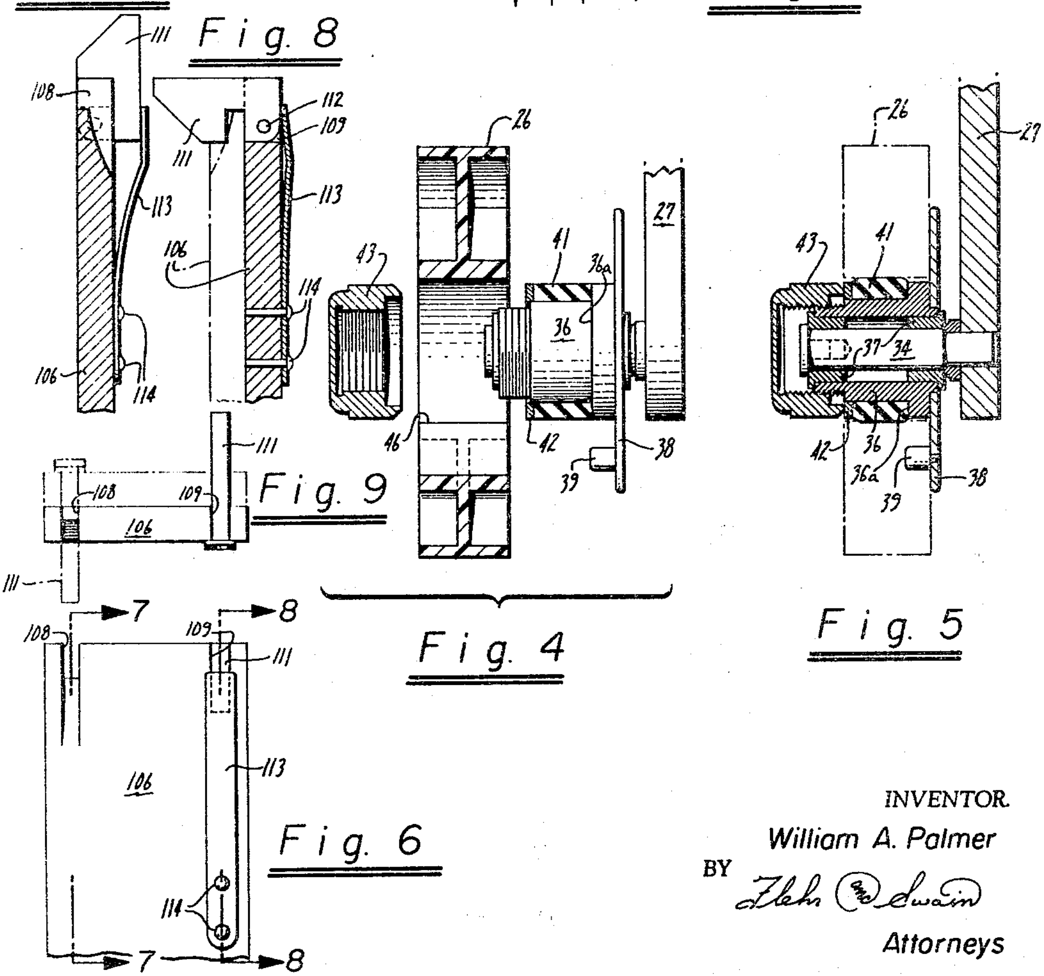
INVENTOR.
William A. Palmer
BY [signature]
Attorneys

INVENTOR.

William A. Palmer

BY Fleher McSwain

Attorneys

United States Patent Office 3,318,548
Patented May 9, 1967

3,318,548
FILM MAGAZINE

William A. Palmer, Menlo Park, Calif., assignor to W. A. Palmer Films, Inc., San Francisco, Calif., a corporation of California Filed Oct. 30, 1964, Ser. No. 407,709
13 Claims. (Cl. 242—55.13)

This invention relates to a film magazine and more particularly to relatively large film magazines for use on commercial type motion picture cameras, projectors, printers, and processing machines.

In conventional film magazines, the film take-up mechanism applies the torque to the center of the roll of film. Since the size of the roll increases as additional film is wound onto the roll, it is necessary that the speed and the torque be varied from start to finish. It has been found that this is very difficult to obtain and, for that reason, it is very difficult to obtain a completely uniform tight wind of a large roll of film. There is, therefore, a need for a new and improved film magazine.

In general, it is an object of the present invention to provide a film magazine in which a substantially constant torque and speed can be utilized in the take-up mechanism for the film reel.

Another object of the invention is to provide a film magazine of the above character by which it is possible to obtain a very uniform tight wind of a large roll of film.

Another object of the invention to to provide a film magazine of the above character which can be operated with only moderate torque which can be provided with a small motor.

Another object of the invention is to provide a film magazine of the above character which can be used for either taking up film or paying out film.

Another object of the invention is to provide a film magazine of the above character which is reversible.

Another object of the invention is to provide a film magazine of the above character which can be mated with another film magazine to provide take-up and pay-out magazine assembly for a motion picture camera or projector.

Another object of the invention is to provide a film magazine of the above character which is provided with a particularly novel means whereby two film magazines can be fastened together to provide a film take-up magazine and a film pay-out magazine for use on a motion picture camera or projector.

Additional objects and features of the invention will appear from the following description in which the preferred embodiment is set forth in detail in conjunction with the accompanying drawings.

Referring to the drawings:

FIGURE 1 is a side elevational view of a pair of film magazines incorporating the present invention and showing one of the film magazines with the cover removed and with the film magazines in a position to be utilized in conjunction with a motion picture camera.

FIGURE 4 is an exploded cross-sectional view showing the manner in which a film core is mounted in a film magazine.

FIGURE 5 is an enlarged cross-sectional view showing the manner in which the film core is held in place.

FIGURE 6 is an enlarged front elevational view of the portion of the backing bar or strip which forms a part of each film magazine.

FIGURE 7 is a cross-sectional view taken along the line 7—7 of FIGURE 6 and shows the latch in a raised position.

FIGURE 8 is a cross-sectional view taken along the line 8—8 and shows the latch in a latching position to hold two magazines together.

FIGURE 9 is a top plan view showing the manner in which two magazines are latched together.

Figures 2, 3:
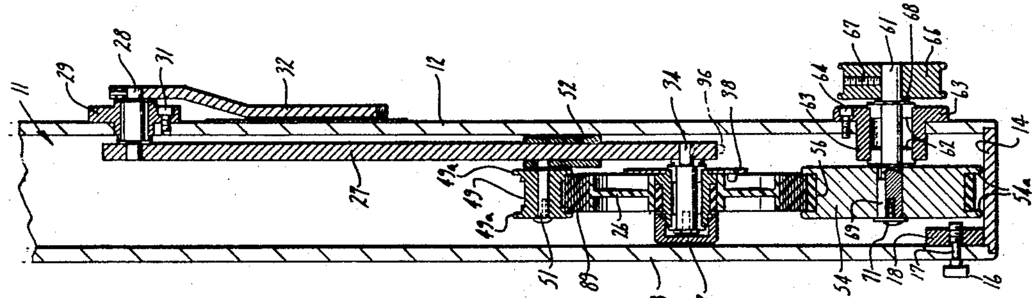
FIGURE 2 is an enlarged side elevational view of one of the film magazines shown in FIGURE 1.
FIGURE 3 is a cross-sectional view taken along the line 3—3 of FIGURE 2.

In general, the film magazine consists of a housing. An arm is disposed in the housing. Means is provided for pviotally mounting the arm in the housing to permit swinging movement of the arm within the housing. A film core is also provided within the housing. Means is provided for mounting the film core on the arm to permit rotation of the film core with respect to the arm but to prevent movement of the film core longitudinally of the arm. A drive roller is also mounted in the housing and means is provided for yieldably urging the film core towards the drive roller so that the drive roller engages the film core or any film which may be wound thereon to drive the same. In addition, the film magazine contains latching means which permits the reels to be reversed and also permits two reels to be fastened together to provide an assembly for taking up and paying out film useful for a motion picture camera and the like.

As shown in the drawings, the film magazine consists of a case or enclosure 11. This case or enclosure is formed by a pair of flat plates 12 and 13 which are generally circular in configuration and a rim or substantially annular member 14. The plates 12 and 13 and the rim 14 can be formed of any suitable material such as magnesium. The plate 12 is secured to the rim 14 by suitable means such as welding. The other plate 13 is removably secured to the rim 14 by suitable means such as screws 16 which are threaded into studs 17 carried by small blocks 18 secured to the rim 14. In addition, the plates 12 and 13 and the rim 14 are formed to provide a relatively flat bottom surface 21 extending from the left of the magazine or housing as viewed in FIGURE 2 to an intermediate portion of the housing. The plates 12 and 13 and the rim 14 are also formed to provide a vertical planar surface 22 which extends at right angles to the surface 21 to facilitate fastening the reels to each other and also to facilitate mounting the same upon a camera or projector as hereinafter described.

It will be noted that the housing 11 forms an enclosure which is in the form of a flat cylinder and which is adapted to receive a large reel of film. A film core 26 is disposed within the housing and has a film receiving slit **26*a*. Means is provided for mounting the film core 26 in the housing and consists of an arm 27. Means is provided for pivotally mounting one end of the arm 27 in the housing so that the arm can be swung between two extreme positions. This mounting means consists of a shaft 28 which is rotatably mounted in a bearing 29 secured to the plate 12 by suitable means such as cap screws 31. A pointer 32 is also mounted on the shaft 28 on the other side of the plate 12 and gives an indication of the position of the arm 27**.

Means is provided for rotatably mounting the film core 26 on the arm and consists of a stud shaft 34 which is secured to the arm 27 by suitable means such as a press fit and which extends therefrom in a direction at right angles to the arm. A sleeve 36 is rotatably mounted on the stud shaft 34 by suitable means such as bearings 37. A flange 38 is mounted on the sleeve and carries a stud 39 which is adapted to engage the film core 26 and to positively engage the same. An annular member 41 of a suitable resilient material such as rubber is mounted on the sleeve 36 and abuts a shoulder **36*a*. A washer 42 is mounted on the sleeve 36 and is adapted to engage the other side of the resilient member 41. Means is provided for moving the washer 42 axially to compress the annular member 41 and consists of a nut 43 which is threaded on the sleeve 36 and is adapted to engage the washer 42** to move the washer axially as shown particularly in FIGURE 5.

From viewing FIGURES 4 and 5, it can be seen that the film core, which can be formed of a suitable material such as plastic, is first placed on the sleeve over the resilient annular member 41. Thereafter, the nut 43 is threaded onto the sleeve to compress the resilient member 41 and to urge it outwardly to cause it to frictionally engage the inner bearing surface of the film core 26 as shown in FIGURE 5 so that the sleeve 36 rotates with the film core as hereinafter described. The film core 26 is provided with a cylindrical inner surface 46 which is engaged by the annular member 41 as it is compressed so that the film core is firmly secured to the sleeve whereby the sleeve will be rotated as the film core is rotated as hereinafter described. The film core 26 is also provided with a cylindrical outer surface 47.

Means is provided for guiding the film onto the film core so that the film will be wound tightly thereon and consists of a roller 49 which is provided with flanges **49*a* which are adapted to overlap the sides of the film core 26 and also which are adapted to ride over the sides of the film as it is wound onto the film core to ensure that the film is wound properly onto the film core. The roller 49 is rotatably mounted upon a pin 51 which is mounted in a slider which extends around the arm 27 and is slidably mounted on the arm 27** for movement longitudinally of the arm to accommodate the changing size of the reel as film is wound on the film core.

Means is provided for driving the film core and the film wound thereon and consists of a roller 54 which is provided with flange portions **54*a* which are adapted to extend over the sides of the film core 26 and over the sides of the film wound thereon as shown in FIGURE 3. The roller 54 is provided with a tire 56 of suitable resilient material such as rubber which is mounted on the roller and disposed between the flanges 54*a* and is adapted to frictionally engage the film core 26 or the film carried thereby. Means is provided for driving the roller and consists of a shaft 61 which is rotatably mounted in bearings 62 mounted in a sleeve 63 secured to the plate 12 by suitable means such as cap screws 64. A drive pulley 64 is secured to the shaft on the outside of the plate 12 by suitable means such as a screw 67. The shaft 61 is retained in the bearing by snap rings 68. The drive roller 65 is mounted on the inner end of the shaft within the case or housing 11 by a key 69 and by a screw 71**.

A sheet metal guide 74 is mounted within the housing behind the film core 26 and is arranged to prevent the film from dropping behind the roll of film which may be wound on the film core. The guide 74 is provided with a large cut-out to permit movement of the arm between its extreme positions. An additional cut-out 77 is provided in the guide and serves as a hand hole to facilitate lifting a roll of film out of the magazine or case 11. The guide 74 also serves a function when the magazine or case is laid down flat in that it supports or holds the film so that it will not slip off of the film core.

The film magazine is provided with a light trap 81 which consists of two parts that are secured to the plate 12 of the case 11 by suitable means such as cap screws 83. It will be noted that the light trap 81 is positioned so that it is in the right angle corner formed by the intersecting surfaces 21 and 22. The light trap 81 is provided with a diamond-shaped inlet opening 86 and a diamond-shaped outlet opening 87. The openings 86 and 87 are formed in this manner so that only the side edges of the film will be engaged by the light trap. They will not engage the front and back surfaces of the film. After the film 89 passes through the light trap 81, it passes over a small guide roller 91 rotatably mounted upon a pin 92 secured to the plate 12. The film thereafter travels onto the film core 26 and is wound thereon as hereinafter described.

Means is provided for yieldably urging the outer end of the arm 27 into a position so that the film core 26 carried thereby or the film wound thereon is engaged by the drive roller 54. In the embodiment shown in the drawings, the force of gravity is utilized for such means. However, it is readily apparent that, if desired, suitable means such as spring means could be utilized for positively but yieldably urging the film core 26 and the film wound thereon into engagement with the drive roller 54.

A spring metal clip 94 is secured to the plate 13 (see FIGURE 2) by suitable means such as screws 95. The clip 94 is provided with a hole (not shown) which receives a tit 96 carried by the arm 27 to hold the arm in a raised or central position as shown by the broken lines in FIGURE 2. This clip is utilized for loading of the magazine and when it is used as a feed magazine as hereinafter described.

A spring-loaded button 101 is mounted upon the plate 12 and is adapted to be engaged by the flange 38 when the arm 27 is raised to its uppermost extreme position. This spring-loaded button fixedly engages this flange and prevents the film roll from coasting in the event the camera stops in the middle of an operation. A clip 102 is secured to the plate 13 by suitable means such as screws 103 and is provided to counter the thrust of the button 101.

As hereinafter described in detail, the magazine is formed so that it can be used either as a feed or a take-up magazine. Thus, as shown in FIGURE 1, two of the magazines can be used as modules to form a case set for use on a camera in which one of the magazines serves as a feed magazine and the other serves as a take-up magazine. Means is provided for securing the magazines to each other and also for securing the magazines to the camera with which they are to be used. This means consists of a backing strip 106 in the form of an elongate bar which is secured to the surface 22 of the body of the magazine by suitable means such as screws 107. The top of the backing plate 106 is formed with a pair of slots 108 and 109. A latch member 111 is pivotally mounted upon a pin 112 mounted in the backing strip 106. Means is provided for yieldably retaining the latch 111 in either an engaging position or an out-of-the-way position and consists of a spring member 113 which engages the latch 111 as shown in FIGURE 12 and which is secured to the backing plate by suitable means such as rivets 114.

By viewing FIGURE 9, it can be seen that when the backing plates of two separate magazines are juxtaposed as shown in FIGURE 9, the latch 111 of one will drop into the milled slot 108 provided on the other backing plate and the latch 111 of the other backing plate will drop into the milled slot 108 provided on the first named backing plate to securely latch the upper parts of the magazines together. In addition, each of the magazines is provided with a bottom plate 116 which is secured to the body of the magazine by suitable means such as screws 117. The plate 116 is provided with a threaded opening 118 which is adapted to receive a screw rotatably carried in the case of the camera to firmly secure the magazine to the camera.

Operation and use of the magazine may now be briefly described as follows. Let it be assumed that the magazine is of such a size that it can carry a 2400 ft. roll of 16 mm. film. In order to load the magazine with film the cover plate 13 is removed from the body by removing the knurled nuts 16. The arm 27 is then moved to a center position so that it is engaged by the clip 96 and retained in this position. The slider 52 is also moved along the arm until it is adjacent the pivot pin or shaft 28. The knurled knob 43 is then loosened. Any film core 26 remaining on the spindle 36 is removed. Thereafter in the dark, a roll of raw stock which carries a film core 26 is placed over the spindle with the film leading off the top to the left as viewed in FIGURE 2. The end of the film is then placed over the roller 91 and through the light trap 81 and through the bottom side of the magazine. The roll of raw stock should then be rotated to make sure that it seats against the flange 38. The knurled knob 43 is then threaded onto the spindle 36 and is tightened so that the hub of the film core 26 is securely retained on the spindle.

After these operations have been completed, the cover plate 13 is replaced and the cap screws 16 are threaded into place.

The loaded magazine may now be placed on the camera by slipping it into the front part of the magazine throat of the camera so that the foot plate 116 engages the camera. Thereafter, approximately a 3 or 4 ft. strip of film is pulled out of the magazine and pushed into the light trap 81 of an empty magazine. Thereafer, the empty magazine and the filled magazine are clipped together by operating the latches 111 and also by threading the magazine locking screws into the camera through the openings 118 provided in the foot plate 116.

Next, the cover plate 13 of the empty magazine is removed and a film core 26 is placed on the spindle 36. The film core should again be positioned so that it bears uniformly on the flange 38. The knurled knob 43 is made relatively tight so that the core is firmly secured thereto. The end of the film is secured to the core by doubling it over for the first ⅛th inch and sliding it into a slot 26*a* provided on the film core and wrapping it around the core for two or more turns.

The arm 27 is then unclipped from the clip 94 and the arm 27 is lowered until the core rests on the rubber tired drive roller 54. The film must be wound clockwise on the core as shown in FIGURE 2 of the drawings. The sliding roller 52 is then brought down so that it straddles the edge of the film to guide it smoothly onto the core. The cover plate 13 is then replaced and secured to the body by the cap screws 16.

In operation of the camera, the drive roller is driven in a counter-clockwise direction as viewed in FIGURES 1 and 2 and positively engages the outer surface of the film 89 carried by the film core 26 to drive the film core to cause film to be taken up by the film core. In particular, it should be noted that the film carried by the film core engages the drive roller 54 at a point which is relatively close to the top surface of the roller 54. Because of this reason, there is a tendency for the film roll to tend to pull itself over the top of the drive roller 54 and to thereby increase the frictional engagement between the drive roller 54 and the film roll. Thus, it can be said that there is a self-energizing effect which is created by this positioning of the roller. In general, it can be stated that the film engages the drive roller at a point which is approximately between 10° and 15° from the vertical. Stated another way, the film roll on the core tends to pull itself in that it wants to climb the rubber-tired drive roller 54 and, therefore, provides excellent frictional engagement between the drive roller and the film roll.

In addition, the flanges on the rubber-tired drive wheel 54 guide the film onto the film roll. Also, the film is also guided onto the film roll by the flanges of the roller 49. By the combination of the drive provided by the drive roller 54 and the flanges of the drive roller 54 and the roller 49, a film roll is formed which is very smooth and tight. As the size of the film roll increases, it can be seen that the arm 27 can swing upwardly and to the right as viewed in FIGURE 2. At the same time, the slider 52 can move upwardly and longitudinally of the arm 27 to accommodate the increasing size of the film roll.

It has been found that the weight loading provided by the arm 27 and the film roll itself are more than sufficient to provide the desired frictional engagement between the drive roller and the film roll. However, if necessary, additional spring means can be provided if desired.

The magazine can be formed of any suitable size. By way of example, it has been found that a magazine capable of carrying 2400 ft. of 16 mm. film can be readily fed out or reeled in by the magazines without any difficulty.

One of the principal advantages of the magazine is that because of the manner in which the film roll is driven, the torque required to drive the film roll is relatively small and remains substantially uniform regardless of the size of the film roll. An additional advantage is that the film roller 54 runs at a uniform speed, also regardless of the size of the film roll and, for example, for 16 mm. film, travels at a rate of 36 ft. per minute. Thus, a relatively inexpensive constant speed, constant torque motor can be utilized for driving the magazine.

As can be seen from FIGURE 1, when the magazine is being used for feeding film, the arm 27 is retained in its uppermost position by the clip 94. Also, in this position, the spring-loaded nylon button engages the flange 38 to prevent the film roll from coasting in the event the camera stops in the middle of a filming operation.

When a filming operation has been completed, the exposed film is removed in a dark room by first removing the cover plate 13 and then placing the hand in the cut-out 12 and in cut-out 76 to lift the film roll of the magazine after the knurled knob 43 has been removed.

Another distinct advantage of this type of magazine is that since the magazines are reversible and can be used either for take-up magazines or feed magazines, three of the modules or magazines are the equivalent of two double magazines of the conventional type because a magazine which has just finished its service as a feed magazine can be turned around and be used as a take-up magazine.

It is apparent from the foregoing that I have provided a new and improved film magazine which is particularly adapted for use with motion picture cameras. It should, however, be appreciated that the same principles can be utilized in connection with smaller motion picture cameras and with motion picture projectors and printers if desired.

I claim:

1. In a magazine, a case, an arm, means for pivotally mounting the arm in the case to permit swinging movement of the arm within the case, a film core, means for rotatably mounting the film core on the arm, a drive roller mounted in the case, means yieldably urging the film core towards the drive roller so that the drive roller engages the film core or the film carried thereby to cause rotation of the film core as the drive roller is rotated, and a guide roller mounted in said case and adapted to be yieldably urged toward said film core to engage the film core or film carried thereby at a location removed from that engaged by the drive roller so that the resistance of the guide roller and the driving force supplied by the drive roller put the film therebetween in tension as the film is wound.

2. A magazine as in claim 1 wherein said drive roller is provided with flanges which straddle the film on the film core.

3. A magazine as in claim 1 wherein said means for rotatably mounting the film core on the arm includes a spindle rotatably mounted on the arm, a flange carried by the spindle, and means for securing the film core to the spindle.

4. In a magazine, a casing having one side opening, a cover plate for closing said opening, said casing having a generally cylindrical configuration, an arm pivotally mounted in said casing at a point substantially removed from the center of said casing, a film core rotatably mounted on the free end of said arm, a drive roller mounted in said casing, means yieldably urging the arm in a direction to move the film core and the free end of the arm so that the film core is urged into frictional engagement with the drive roller, said drive roller being provided with flanges which straddle the film on the film core, and a roller slidably mounted on said arm for movement longitudinally thereof, said last named roller having flanges straddling said film to guide the film onto the roll.

5. A magazine as in claim 1 wherein said means for rotatably mounting said film core on said arm consists of the spindle rotatably mounted on said arm, a resilient member carried by said spindle, and means for compressing said resilient member to urge the resilient member into engagement with the hub of the film core to thereby firmly secure the film core to the spindle.

6. In a magazine assembly, a feed magazine and a take-up magazine, means for securing the feed magazine and the tap-up magazine each of said magazines being identical together into a unitary assembly, an arm pivotally mounted in said feed magazine, a film roll rotatably carried by said arm, means for retaining the free end of said arm in a centrally disposed position in the feed magazine, an arm pivotally mounted in the take-up magazine, a film core rotatably mounted on the free end of the arm, a drive roller mounted in the take-up magazine, and means yieldably urging the arm and the film core carried thereby toward the drive roller so that the drive roller frictionally engages the film core and the film carried thereby to cause same to take up film.

7. An assembly as in claim 6 wherein said means for securing the two magazines together consists of a back-up plate secured to each of the magazines, and cooperative latch means carried by each of the back-up plates and engaging the other of the back-up plates.

8. In a magazine, a case, an arm, means for pivotally mounting the arm in the case to permit swinging movement of the arm within the case, a film core, means for rotatably mounting the film core on the arm, a drive roller mounted in the case, means yieldably urging the film core towards the drive roller so that the drive roller engages the film core or the film carried thereby to cause rotation of the film core as the drive roller is rotated, and a roller slidably mounted on said arm, said roller having flanges adapted to straddle the film on the film core.

9. In a magazine, a case, an arm, means for pivotally mounting the arm in the case to permit swinging movement of the arm within the case, a film core, means for rotatably mounting the film core on the arm, a drive roller mounted in the case, means yieldably urging the film core towards the drive roller so that the drive roller engages the film core as the drive roller is rotated, and a backing plate secured to the case together with cooperative mating means carried by the backing plate adapted to engage the backing plate of another magazine to secure a pair of such magazines into a set.

10. In a magazine, a case, an arm, means for pivotally mounting the arm in the case to permit swinging movement of the arm within the case, a film core, means for rotatably mounting the film core on the arm, a drive roller mounting in the case, means yieldably urging the film core towards the drive roller so that the drive roller engages the film core or the film carried thereby to cause rotation of the film core as the drive roller is rotated, and means for retaining the arm together with the film roller out of engagement with the drive roller and against the force of the yieldable means.

11. A magazine as in claim 10 together with means for frictionally retarding the movement of said film core when it is in a position out of engagement with the drive roller.

12. In a magazine, a case, a drive roller mounted in the case, an arm, a film core, means for rotatably mounting the film core on the arm, means for pivotally mounting the arm in the case to permit swinging movement of the arm therein such that when the film core is nearly empty the arm swings into a position approaching an in-line relationship with the drive roller so as to increase the force of contact therebetween when the drive roller is rotating in a direction to bring the arm into alignment, means yieldably urging the film core towards the drive roller so that the drive roller engages the film core or the film carried thereby to cause rotation of the film core as the drive roller is rotated, and a guide roller mounted in the case and adapted to be yieldably urged toward said film core to engage the core or the film carried thereby at a location remote from that engaged by the drive roller, said drive roller, film core, and guide roller being arranged with respect to each other such that the resistance of the guide roller acting on the film and the driving force supplied by the drive roller act in opposite directions to thereby place that portion of the film therebetween in tension so that a uniform tight wind film is achieved.

13. A magazine as in claim 12 in which the guide roller and the driving roller are arranged so that the arc of the film therebetween increases as the amount of film on the core increases.

References Cited by the Examiner

UNITED STATES PATENTS

| | | | |
|---|---|---|---|
| 1,518,026 | 12/1924 | Van Sluys | 242—72 |
| 1,871,236 | 8/1932 | Proctor | 242—55.13 |
| 2,605,056 | 7/1952 | De Kanski et al. | 242—65 X |
| 2,804,508 | 8/1957 | Mastling et al. | 242—55.13 X |
| 3,000,582 | 9/1961 | Brede | 242—55.11 |

FOREIGN PATENTS

| | | |
|---|---|---|
| 371,326 | 3/1923 | Germany. |

FRANK J. COHEN, *Primary Examiner.*

G. F. MAUTZ, *Assistant Examiner.*